Jan. 3, 1933.  C. L. JONES  1,893,330
PERMEABLE METAL AND METHOD OF MAKING THE SAME
Filed Aug. 7, 1928
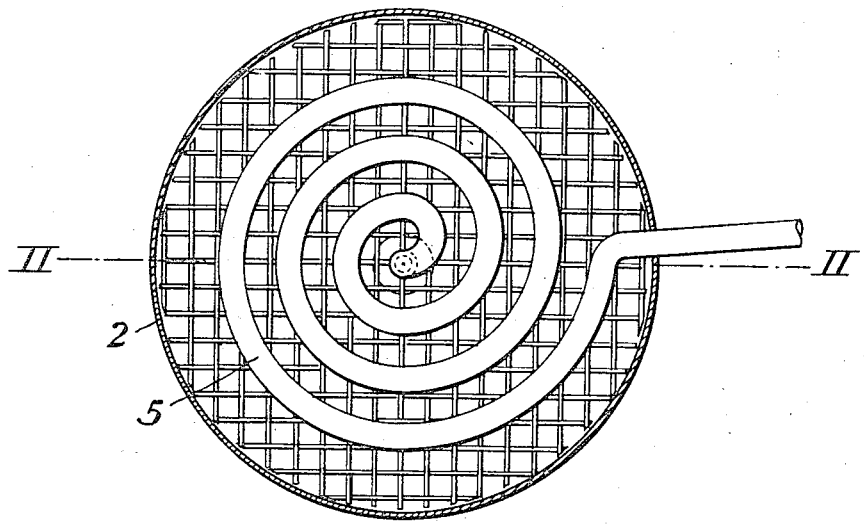
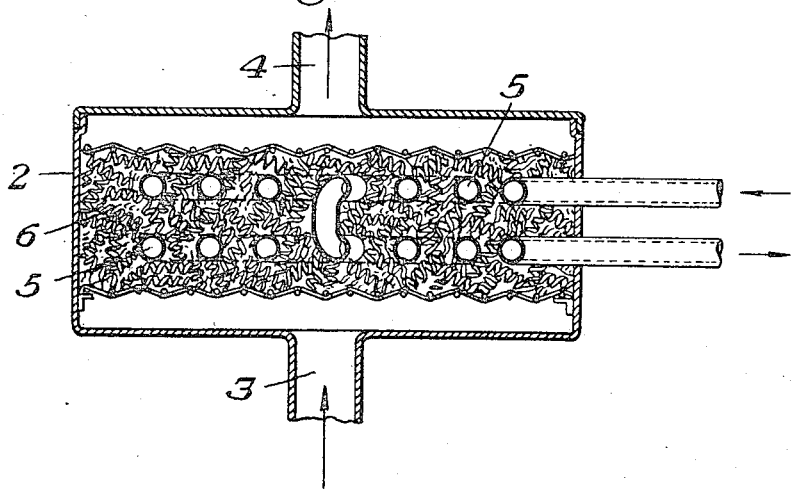
INVENTOR
Charles L. Jones
by his attorneys
Byrnes, Stebbins & Parmelee.

Patented Jan. 3, 1933

1,893,330

UNITED STATES PATENT OFFICE

CHARLES L. JONES, OF PITTSBURGH, PENNSYLVANIA

PERMEABLE METAL AND METHOD OF MAKING THE SAME

Application filed August 7, 1928. Serial No. 297,953.

This invention relates generally to permeable metals and to a method of making the same, and particularly to permeable metals comprising metallic particles bonded together to provide continuous heat transferring surfaces.

A permeable metallic bed made in accordance with my invention may be made at relatively small cost and may be employed to form the bed of heat exchange apparatus.

Such a permeable metal also is suitable for use in the arts in bubbling gases through liquids, and in general may be employed wherever porous ceramic plates are used for diffusing gases in liquids, filtering liquids, and other similar purposes.

In the drawing, which illustrates the present preferred embodiment of a heat transfer apparatus including a bed of permeable metal made in accordance with my invention, Figure 1 is a plan view of the heat exchange apparatus; and Figure 2 is a section taken on the line II—II of Figure 1.

Heretofore metallic chips, turnings, or borings have been used in the heat exchange art as beds for transferring heat in heat exchange apparatus. Such an apparatus is described in the United States patent to Best, No. 485,526. Although a bed such as is described in the patent is suitable in certain instances, such beds may not be successfully employed where it is necessary to transfer heat very rapidly. This is due to the fact that in a bed composed of metallic chips, turnings or borings, such as is described in the patent, the chips are not bonded together in order to form continuous heat conducting surfaces. The voids between the metallic particles prevent the rapid transfer of heat.

In accordance with my invention, I provide a permeable metal composed of metallic particles bonded together so that the permeable metal presents continuous heat transferring surfaces which rapidly conduct heat to or from one medium to another. In such a heat transfer the heat is transferred substantially entirely by conduction, whereas in the beds of metallic chips, such as described in the patent to Best, the heat is transferred from particle to particle through air spaces by convection.

In forming a permeable metallic bed in accordance with my invention in order to provide continuous heat transferring surfaces, I may proceed as follows:

A vessel is filled with clean metallic particles, such as copper turnings or borings, and the particles are heated. A small quantity of any suitable soldering flux is then added to the particles and thereafter molten solder is introduced into the container, thereby filling up the voids between the metallic particles and bonding the particles together. The excess solder is then drained off, leaving a bed of metallic particles bonded together by the solder. In order to increase the permeability of the bed thus produced, compressed air or other gas is blown through the hot mass to remove any excess solder which was not eliminated by draining the solder from the metallic particles. By this means the permeability of the resultant bed may be controlled. This method provides a permeable bed or mass of metallic particles having continuous metallic connection throughout and in which heat can flow by conduction without encountering surface resistances between the particles.

It will be apparent that although in the above preferred example I have used copper turnings as the metallic particles and solder as the metal for bonding the particles together in order to provide continuous heat transferring surfaces, any metal having good heat conducting properties may be employed in place of the copper particles and any suitable metal can be employed in place of the solder in order to join the particles together. It also will be apparent that instead of employing copper particles, other metal particles or particles comprising alloys may be used, and in place of the solder, any metal or mixture of metals of a lower fusing point than the fusing point of the metallic particles may be employed to bond the particles together. By the term "metal" it is intended to include not only metals in the technical sense, but alloys and mixtures of metals as well.

For many purposes it is desirable to produce a permeable bed which is resistant to high temperatures. In producing such a bed, metals of high melting point must be employed and it becomes increasingly difficult to produce the desired structure by melting one of the constituents in order to form a binding medium for the other constituent. In such cases, it is desirable to electroplate the particles which form the permeable bed with a metal such as nickel, chromium, or other suitable metal. In carrying out the electroplating step the methods now commonly employed in the electroplating art are followed, except that in order to uniformly plate the particles, they are first compressed to form a mass having good electrical conductivity, and this mass is itself used as the cathode. The electrolyte is forced through the mass of compressed particles, thereby plating the particles and bonding them together so as to provide continuous heat transferring surfaces. In the electroplating process every precaution should be taken to insure that the mass of metallic particles is sufficiently compressed before immersing it in the electrolyte so as to make good electrical connection between the particles in order that the entire mass of compressed metallic particles will assume the proper potential throughout its mass.

Instead of mixing molten metal with metallic particles and then draining off the excess molten metal, I might, if desired, coat the metallic particles by dipping them in a molten metal, such as solder, having a lower fusing point than the fusing point of the metallic particles, in order to coat them. The coated particles are then tumbled either in a wire basket or a perforated tumbling drum while they cool. The resultant coated particles are then compressed into any desired shape, and the entire compressed mass is subjected to heat in order to soften the coating of the metallic particles and to join the particles together.

Another method of providing a permeable metallic bed is to mix the particles with a fine powder of a metal having a lower melting point than the melting point of the particles. The mixture is then compressed to form the desired mass and thereafter is heated in order to melt the powder and to bond the particles together.

In some cases it is desirable to orient the particles which make up the permeable metal. For example, in a heat exchange aparatus provided with tubes or other means for conveying fluid through the apparatus, and a bed of permeable metal, it is desirable to have the contact of the permeable bed exceptionally good at the surfaces of the tubes. This may be accomplished by subjecting the metallic particles which form the bed to the action of a magnetic field of the desired intensity and direction in order to orient the particles, and thereafter proceeding in accordance with any of the methods above described in order to bond the particles together.

In the drawing I have illustrated in a somewhat diagrammatic manner a heat exchange device employing a permeable metallic bed in accordance with my invention. The heat exchange device comprises a shell 2 having a conduit 3 arranged in the bottom of the shell for introducing a cooling gas, and having a conduit 4 at the top of the shell through which the cooling gas leaves the heat exchanger. A coiled tube 5 through which the liquid to be cooled is passed, is arranged within the shell 2 and embedded in a permeable bed 6 comprising metallic particles bonded together. The bed 6 is supported within the shell 2 by any desired means such as a wire frame 7.

In the apparatus above described, the liquid to be cooled flows in through the upper end of the coiled tube 5, is cooled by the gas flowing upwardly through the heat exchanger and then flows out through the lower end of the coiled tube.

My invention is not limited to providing a permeable bed to be used in heat exchange apparatus. It contemplates a permeable bed of metallic particles bonded together which is useful for other purposes, such, for example, as in the arts where porous ceramic plates are now employed for diffusing gases in liquids, filtering liquids, and other similar purposes.

It is to be understood that the forms of the invention herein shown and described are to be taken as preferred examples of the same and that the invention may be otherwise modified without departing from the spirit of the invention or the scope of the following claims.

I claim:

1. The method of making permeable metal which comprises providing a bed of metallic particles in a container, orienting the particles by subjecting them to the action of a magnetic field, introducing molten metal of lower melting point than the melting point of the particles into the container to bond the particles together, and draining off the excess molten metal.

2. The method of making permeable metal which comprises providing a bed of metallic particles in a container, introducing molten metal of lower melting point than the melting point of the particles into the container to bond the particles together, draining off the excess molten metal and forcing a gas through the bed while said metal is in a molten condition to increase the permeability of the bed.

3. The method of providing a permeable metal bed in heat exchange devices which comprises providing a means for conveying a fluid through the device, surrounding the means with a bed of metallic particles, orienting the particles by subjecting them to the action of a magnetic field, adding molten metal of lower melting point than the melting point of the particles to the bed of oriented metallic particles to bond the particles together, and draining off the excess molten metal.

4. A permeable metal comprising metallic particles bonded together, said particles being oriented before bonding by subjecting them to the action of a magnetic field.

In testimony whereof I have hereunto set my hand.

CHARLES L. JONES.